(No Model.)
J. S. GRANT.
HORSE BLANKET.
No. 457,196. Patented Aug. 4, 1891.
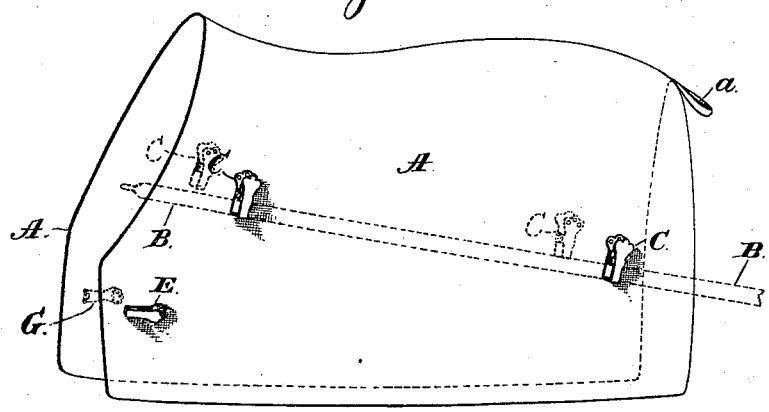
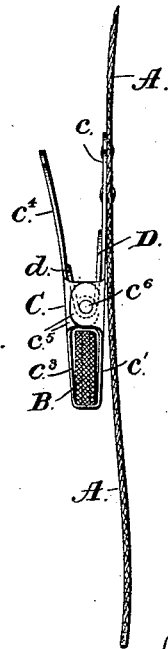
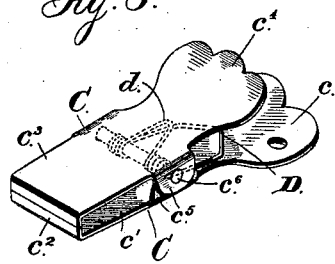
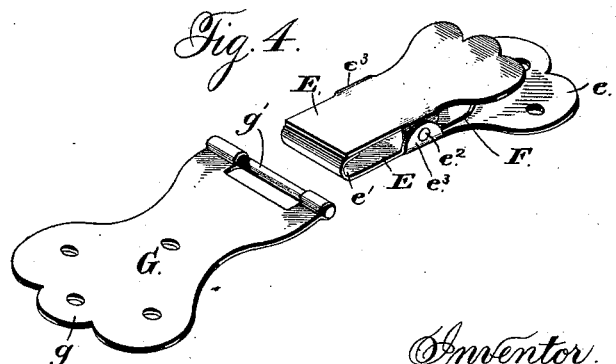
Witnesses:
Jas. E. Hutchinson
Henry C. Hazard
Inventor.
John S. Grant
by Prindle and Russell
his Attorneys
THE NORRIS PETERS CO., PHOTO-LITHO., WASHINGTON, D. C.

UNITED STATES PATENT OFFICE.

JOHN STEPHEN GRANT, OF STILLWATER, MINNESOTA, ASSIGNOR OF ONE-HALF TO JAMES CLINTON RHODES, JR., OF SAME PLACE.

HORSE-BLANKET.

SPECIFICATION forming part of Letters Patent No. 457,196, dated August 4, 1891.

Application filed December 30, 1890. Serial No. 376,254. (No model.)

*To all whom it may concern:*

Be it known that I, JOHN STEPHEN GRANT, of Stillwater, in the county of Washington, and in the State of Minnesota, have invented certain new and useful Improvements in Holding Devices for Horse-Covers; and I do hereby declare that the following is a full, clear, and exact description thereof, reference being had to the accompanying drawings, in which—

Figure 1 shows a perspective view of a horse blanket or cover provided with my improved fastening devices; Fig. 2, a detail enlarged view showing one of the trace or tug engaging clasps in operation; Fig. 3, a detail enlarged perspective view of such clasp, and Fig. 4 a similar view of the clasp for the breast part of the blanket or cover.

Letters of like name and kind refer to like parts in each of the figures.

The object of my invention is to provide a horse blanket or cover having improved means for holding it down in place on a harnessed horse; and to this end my invention consists in the blanket or cover provided with the holding means, as hereinafter specified.

The special purpose of my invention has been to provide a horse blanket or cover furnished with means for so securing it in place on a harnessed horse that the owner of the latter can leave him at any time with the certainty that he will stay covered and remain fully protected by the covering, however much the wind may blow or however restless or uneasy the horse may be.

When, as is ordinarily the case, it is attempted to fasten a blanket upon a horse by straps or girths around the horse's body with or without breast and crupper straps or cords, it is found impossible to make sure that the blanket will stay as adjusted and will not be worked around or got out of place by the animal's movements. The result is, that the owner after he has left the horse for some time will find the covering so turned as to be of little or no protection, if it be not worked entirely off or trampled under the horse's feet. As, when a horse is warm and moist with perspiration, it is not desirable to strap a blanket tightly around and against the surface of his body, since to do so would be to check and retard his drying off, I have so arranged my fastening devices that the blanket can be held certainly and securely in place to protect the animal's body from the wind, while not being pressed in contact therewith so closely as to prevent evaporation of the perspiration.

While I shall describe my holding devices hereinafter as applied to a blanket, I desire it to be understood that they are to be used similarly for the holding of all kinds of horse-covers, whether water-proof or other blankets, fly-nets, dusters, or other forms of covering.

In the drawings, A designates a blanket, which can be of any desired form and material, with or without the usual crupper cord or strap $a$, though I prefer to have the latter device in place. It is not, however, necessary for the holding of the blanket down in place when my fastening devices are used. Attached to each side of the blanket in position to engage the tug or trace B on that side are the clasps C C, which, as shown in the drawings, are two in number. Instead, any other desired number can be employed to engage the trace at several different points. Ordinarily two will be enough, one being situated near the rear edge or end of the blanket while the other is placed well forward to hold the front part of the blanket down. Each of these tug or trace engaging devices consists of a clasp having the attaching part $c$, adapted to be sewed, riveted, or otherwise secured to the blanket, the extension $c'$ from such part forming one of the jaws and having its outer end bent at right angles to form a projecting portion $c^2$ to engage the under side of the trace or tug and the correspondingly-shaped jaw $c^3$, pivoted to the first-named jaw and having a handle or thumb-piece $c^4$, by which it can be moved. The projection $c^2$ formed by bending the outer end of the second jaw at a right angle, abuts against the corresponding projection on the other jaw, and like it is adapted to extend under and engage the lower side of the trace or tug. The two projections are together of a height equal to or greater than the thickness of the trace, so that the latter is not clamped so much as encircled by the jaws. While said jaws can be pivoted together in any desired way, I prefer to connect them, as shown in the drawings, by pivotal lugs or ears $c^5$ $c^5$ on each, having openings engaged by a pivot rod or pin $c^6$, extending across between the jaws. For holding the latter normally closed, I provide a spring D on said rod or pin, engaging with its opposite ends the portions of the jaws or their attaching and handle parts on the opposite side of the pivot from the abutting projections on the lower jaw ends. As shown, such spring consists of a wire which is bent to form a loop or bend $d$ to engage part of one jaw and on opposite sides of said bend is wound around the pivot-pin, its outer ends being carried outward, so as to engage and press upon the inner face of the other jaw or the attaching part of the latter. Such a spring is desirable, as being most easily and cheaply made, while strong and not liable to break. I do not, however, limit myself to its use, as any other suitable means for holding the jaws closed can be employed.

If desired, any one of the well-known forms of device for positively locking the jaws of clamps or clasps together can be made use of without departure from my invention.

The distance from the jaw projections $c^2$ $c^2$ to the pivotal lugs or ears on the jaws should be equal to or somewhat greater than the width of the trace or tug to be engaged.

The blanket or cover is held together at the breast by a clasp consisting of two engaging parts. One is formed of a pair of spring-held jaws E E, of which one has the attaching part $e$, adapted to be sewed or otherwise fastened to the blanket near its edge, as shown in the drawings, and the outer end bent over upon itself to form a hook $e'$, and the other having on its inner end the thumb-piece or handle has its outer end adapted to overlap and rest upon the hook $e'$. The two jaws are pivoted together in the same manner as the tug-engaging ones by a pivot-pin $e^2$, passing through pivotal ears $e^3$ $e^3$, two on each jaw. A spring F, constructed and operating like the one D, already described hereinbefore, serves to hold the outer jaw ends normally together. The outer portion of the breast-clasp consists of a plate G, having the attaching part $g$, adapted to be sewed or otherwise attached to the edge of the blanket, and at its outer end provided with a pin or cross-bar $g'$, adapted to be engaged by the hook $e'$.

As in the case of the tug-engaging clasps, hereinbefore described, any desired form of positive device for holding the jaws E E closed may be employed instead of the spring without departure from my invention.

A blanket or cover provided with the fastening devices shown and described can be easily and quickly secured upon a harnessed horse by simply snapping the tug-engaging clasps over the tugs or traces on the opposite sides and causing the hook on the breast-portion clasp to engage the cross-bar $g'$ on the other part of said clasp. With two or more of the tug-engaging clasps on each side of the cover the latter will be held down securely, so as to protect the horse's sides, and cannot work off of the horse or get out of position. With the breast-clasp fastened all tendency of the cover to work along the horse's body will be checked. Without such device I have found that the blanket or cover will be effectually held in place by its clasps engaging the tugs or traces, so that the owner of the horse having once covered him up can leave him as long as desired with the certainty that the covering will remain in its proper place, in which he has put it.

When, as I prefer, the clasps are made of sheet metal, they can be manufactured easily and at a very small expense, so that my fastening devices will furnish a very cheap, as well as most efficient, means of securing the blanket or cover.

The side clasps will hold the sides of a blanket down close to but not against the horse's sides so as to interfere with his drying off if he has become damp with perspiration.

The edges of the blanket or cover below the tug-engaging clasps can be allowed to hang down or can be drawn in under the horse's belly by suitable straps or tapes.

While for the sake of clearness and in order that the manner of using the holding or fastening devices with which my horse blanket or cover is provided may be fully understood, I have shown the clasps in detail I desire it to be understood that I do not claim such clasps by themselves and separated from the blanket or cover in the present application, but intend to do so in another application to be filed.

Having thus described my invention, what I claim is—

A horse-cover having trace or tug engaging clasps situated on the sides thereof in lines substantially coincident with the trace or tug, and having jaws formed to embrace the latter and provided with abrupt projecting portions to positively engage the under side of the trace or tug, substantially as and for the purpose specified.

In testimony that I claim the foregoing I have hereunto set my hand this 22d day of November, A. D. 1890.

JOHN STEPHEN GRANT.

Witnesses:
H. E. SMITH,
J. C. RHODES, Jr.